(12) United States Patent
Mizutani et al.

(10) Patent No.: US 7,996,196 B2
(45) Date of Patent: Aug. 9, 2011

(54) STRUCTURAL ANALYSIS OF A PRINTED WIRING SUBSTRATE

(75) Inventors: Daisuke Mizutani, Kawasaki (JP); Nobutaka Itoh, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/553,326

(22) Filed: Sep. 3, 2009

(65) Prior Publication Data

US 2009/0326883 A1 Dec. 31, 2009

Related U.S. Application Data

(63) Continuation of application No. PCT/JP2007/054445, filed on Mar. 7, 2007.

(51) Int. Cl.
*G06F 7/60* (2006.01)
*G06G 7/48* (2006.01)
*C03B 37/07* (2006.01)
*C03B 5/24* (2006.01)

(52) U.S. Cl. .......... 703/6; 703/2; 703/5; 65/377; 65/484

(58) Field of Classification Search .................. 703/2, 5, 703/6; 65/377, 484
See application file for complete search history.

(56) References Cited

U.S. PATENT DOCUMENTS

| | | | | |
|---|---|---|---|---|
| 5,868,887 | A * | 2/1999 | Sylvester et al. | 156/150 |
| 5,888,630 | A * | 3/1999 | Sylvester et al. | 428/212 |
| 7,139,678 | B2 * | 11/2006 | Kobayashi et al. | 702/183 |
| 7,222,316 | B2 * | 5/2007 | Fukuzono et al. | 716/4 |
| 7,260,806 | B2 | 8/2007 | Fukuzono et al. | |
| 2006/0173660 | A1 | 8/2006 | Itoh et al. | |
| 2006/0212155 | A1 | 9/2006 | Fukuzono et al. | |
| 2008/0168413 | A1 | 7/2008 | Kakino et al. | |

FOREIGN PATENT DOCUMENTS

| | | |
|---|---|---|
| JP | 09-218032 A | 8/1997 |
| JP | 10-093206 A | 4/1998 |

(Continued)

OTHER PUBLICATIONS

Notification of Transmittal of Translation of the International Preliminary Report on Patentability ( Form PCT/IB/338) of International Application No. PCT/JP2007/054445 mailed Oct. 8, 2009 with Forms PCT/IB/373 and PCT/ISA/237.

(Continued)

*Primary Examiner* — Paul L Rodriguez
*Assistant Examiner* — Nithya Janakiraman
(74) *Attorney, Agent, or Firm* — Westerman, Hattori, Daniels & Adrian, LLP

(57) ABSTRACT

A first generation portion divides an object to be analyzed into a plurality of finite elements to generate element division data. A first calculation portion defines and calculates a plurality of meshes dividing the object to be analyzed into units larger than the finite elements. A second generation portion assumes that a friction layer which has a thickness of "0" and a friction coefficient between a conductive material and a composite material of a predetermined value less than 1 exists at the interface between the conductive material and the composite material, and the second generation portion generates mesh data. A second calculation portion uses various solvers to calculate the physical amounts produced in the object to be analyzed on the basis of the mesh data and outputs the analysis result. In other words, the second calculation portion performs a simulation of the behavior of the object to be analyzed.

12 Claims, 11 Drawing Sheets

FOREIGN PATENT DOCUMENTS

| | | |
|---|---|---|
| JP | 10-111879 A | 4/1998 |
| JP | 2000-231579 A | 8/2000 |
| JP | 2004-13437 A | 1/2004 |
| JP | 2006-072893 A | 3/2006 |
| JP | 2006-209629 A | 8/2006 |
| JP | 2006-261381 A | 9/2006 |
| JP | 2006-339423 A | 12/2006 |
| JP | 2007-27152 A | 2/2007 |

OTHER PUBLICATIONS

International Search Report of PCT/JP2007/054445, Mailing Date of Apr. 10, 2007.

* cited by examiner

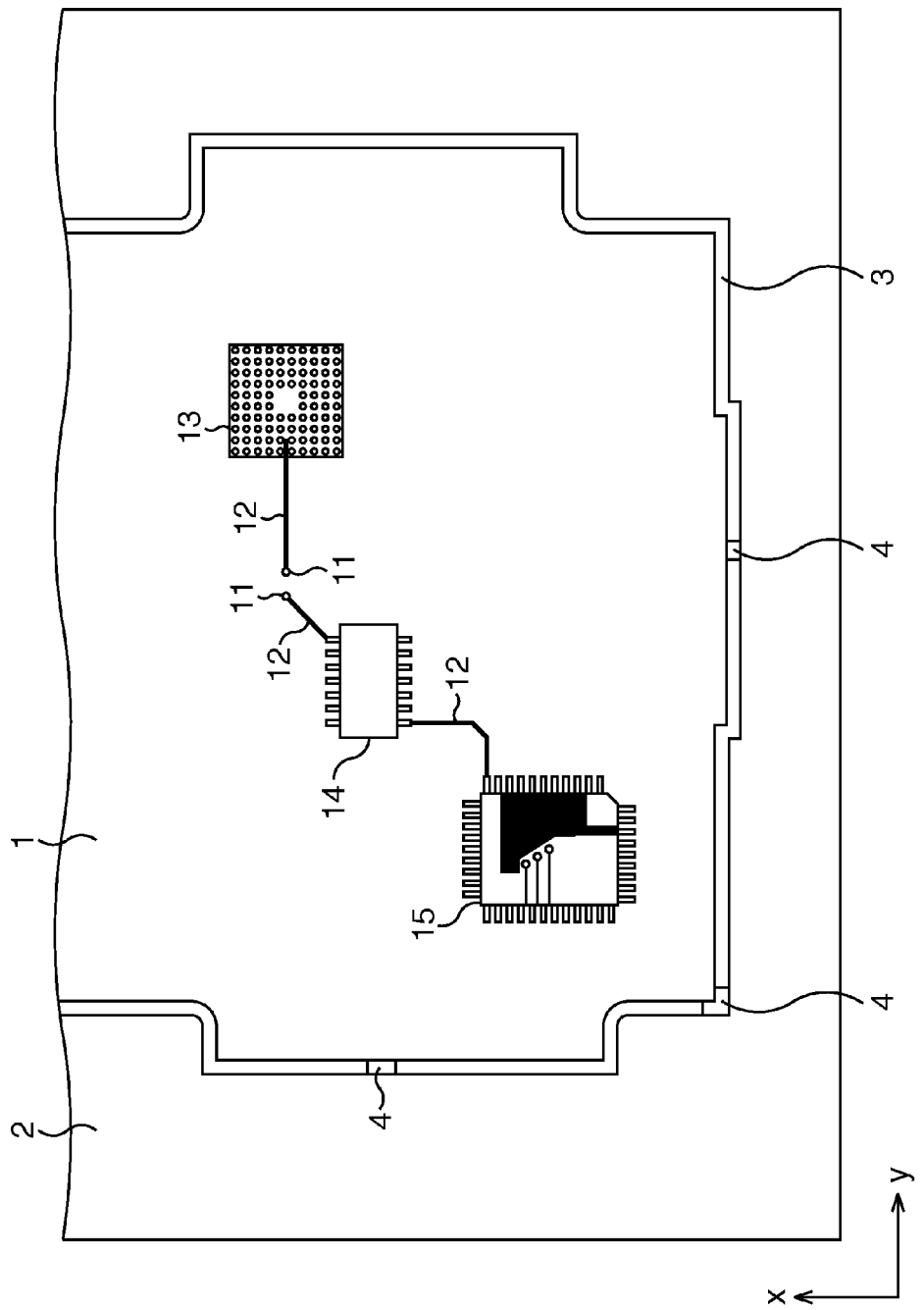

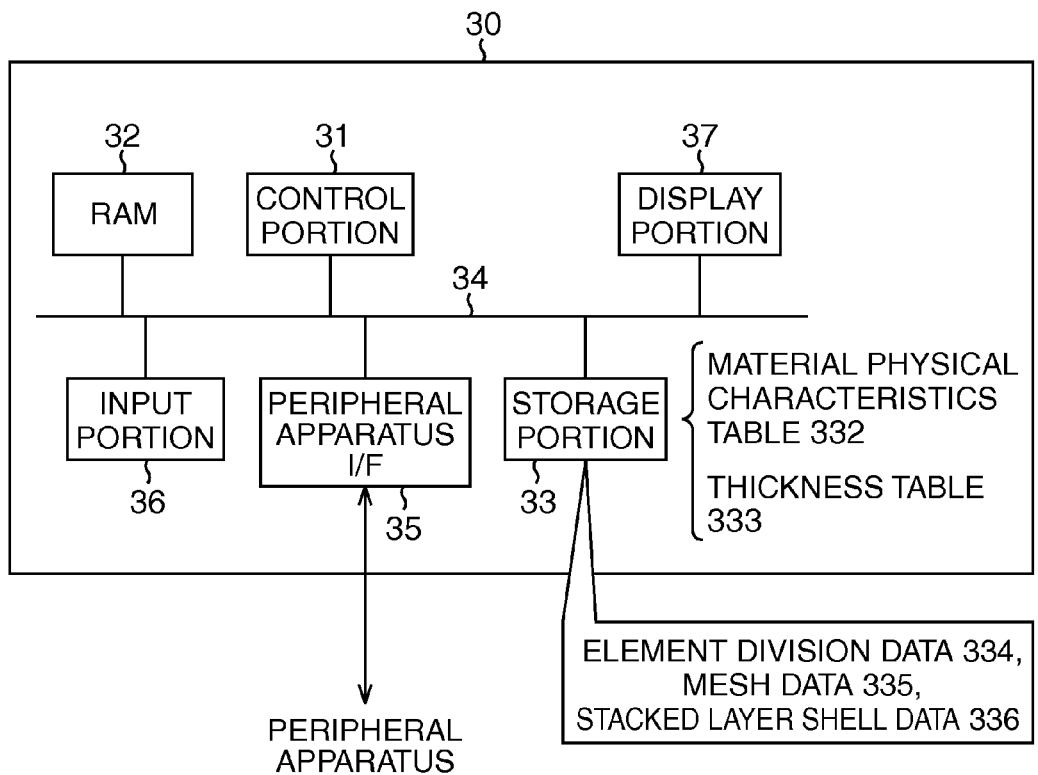

FIG. 5

| POSITIONAL INFORMATION | THICKNESS |
|---|---|
| x1, y1 | TP1 |
| x2, y2 | TP2 |
| ... | ... |

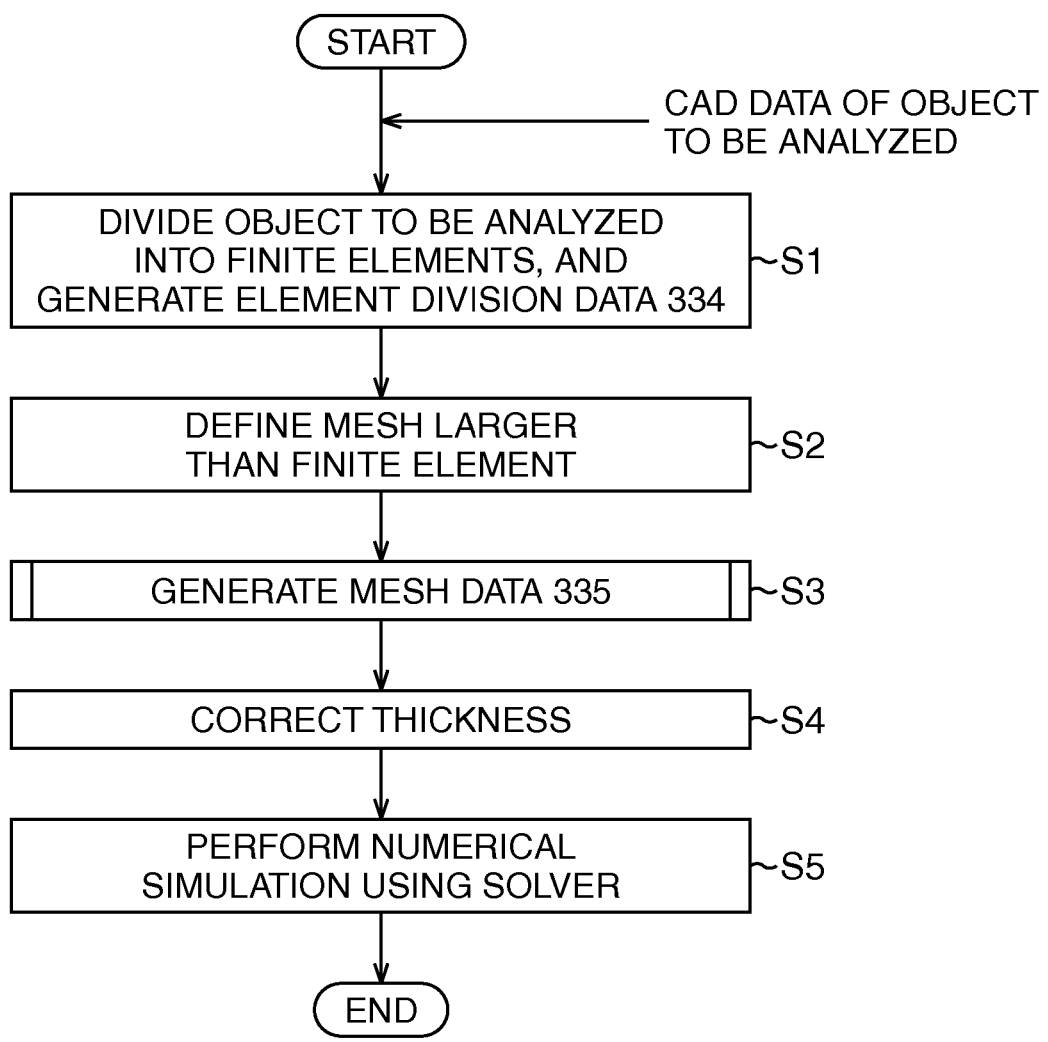

ELEMENT DIVISION DATA

| ELEMENT ID | LAYER NUMBER | FIRST NODE | ... | EIGHTH NODE | MATERIAL |
|---|---|---|---|---|---|
| 1 | 1 | x11, y11, z11 | ... | x18, y18, z18 | M1 |
| 2 | 1 | x21, y21, z21 | ... | x28, y28, z28 | M2 |
| 3 | 1 | x31, y31, z31 | ... | x38, y38, z38 | M2 |
| 4 | 1 | x41, y41, z41 | ... | x48, y48, z48 | M3 |
| ... | ... | ... | ... | ... | ... |

STACKED LAYER SHELL DATA

| TWO-DIMENSIONAL MESH ID | FIRST NODE | ... | FOURTH NODE | MATERIAL AND THICKNESS LIST |
|---|---|---|---|---|
| 1 | Mx11, My11 | ... | Mx14, My14 | (M1:T11, M2:T12, M3:T13) |
| 2 | Mx21, My21 | ... | Mx24, My24 | (M1:T21, M3:T23) |
| 3 | Mx31, My31 | ... | Mx34, My34 | (M2:T32, M1:T31) |
| 4 | Mx41, My41 | ... | Mx44, My44 | (M1:T41, M2:T42, M3:T43) |
| ... | ... | ... | ... | ... |

STRUCTURAL ANALYSIS OF A PRINTED WIRING SUBSTRATE

CROSS-REFERENCE TO RELATED APPLICATIONS

This application is a Continuation of International Application No. PCT/JP2007/054445, with an international filing date of Mar. 7, 2007, which designating the United States of America, the entire contents of which are incorporated herein by reference.

FIELD

The present invention relates to an analyzer, an analysis method, and an analysis program product for performing structural analysis of an object to be analyzed with an employing finite element method.

BACKGROUND

A printed wiring substrate, on which an integrated circuit pattern is formed by using a mask technology is employed in a motherboard of an electronic device or the like. A mask technology is disclosed in Japanese Laid-open Patent Publication No. 09-218032, for example.

Warpage is sometimes produced in a printed wiring substrate in accordance with a temperature condition of a reflow process for mounting an electronic part (an LSI (Large Scale Integration), for example) on the printed wiring substrate. The occurrence of such warpage causes non-adhesion or short-circuit of a bump join portion or the like of the electronic part, whereby the product yield is reduced.

Therefore, arts in which a CAD (Computer Aided Design) system and a finite element method are combined to structurally analyze a printed wiring substrate and predict warpage that is produced in the printed wiring substrate have been devised (see, for example, Japanese Laid-open Patent Publication No. 2004-13437, Japanese Patent No. 3329667, and Japanese Laid-open Patent Publication No. 2000-231579). With the related arts, as a result of the prediction, design modifications can be implemented to produce a printed wiring substrate with less warpage produced in the mounting process.

However, even with the related arts, predictions cannot be made with sufficiently high accuracy, thus warpage produced in the mounting process cannot be sufficiently suppressed.

Another related art is disclosed in Japanese Laid-open Patent Publication No. 2006-209629, which accomplishes the intended purpose. However, it is difficult to sufficiently suppress warpage produced in the mounting process.

SUMMARY

As a result of earnest studies to solve problems with the related art, the present inventors realized that, despite the fact that composite materials including glass fibers impregnated with a resin are used in printed wiring substrates, in the related art, the material physical characteristics of such composite materials are treated as being uniform. In such composite materials, only the resin becomes temporarily fluid, and the stress is relaxed in a temperature range above the glass transition temperature of the resin. Therefore, the behavior of the material physical characteristics around the glass transition temperature is complicated. However, with the related art, such behavior cannot be predicted, thus the prediction accuracy is low around the glass transition temperature.

Then, as a result of many studies based on such findings, the present inventors accomplished the following aspects of the present invention.

According to an aspect of the embodiment, an analyzer is provided with a divider dividing an object to be analyzed into a plurality of elements, and a simulator performing a simulation of a behavior of the object to be analyzed within an arbitrary temperature range with using the plurality of elements. Further, the analyzer is provided with an assumer assuming that, when among the plurality of elements, one of the adjacent elements contains a material having a glass transition temperature within the temperature range, and the other contains a material not having a glass transition temperature within the temperature range, a friction coefficient between the elements is less than one. The simulator, if the assumption has been made by the assumer, uses an assumed friction coefficient.

Not only an element obtained by division, but also an aggregate of a plurality of elements which have been obtained by division may be used as an element.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a diagram illustrating a surface of a printed wiring substrate 1 where electronic parts are to be mounted;

FIG. 3 is a block diagram illustrating a composition of the structural analysis apparatus according to the embodiment;

FIG. 4 is a diagram illustrating an example of a data composition of a material physical characteristics table 332;

FIG. 5 is a diagram illustrating an example of a data composition of a thickness table 333;

FIG. 7 is a flowchart illustrating an operation of the structural analysis apparatus 30 according to the embodiment;

DESCRIPTION OF EMBODIMENTS

An embodiment will be illustrated below with reference to the accompanying drawings. A structural analysis apparatus according to the embodiment is an apparatus for performing structural analysis of a printed wiring substrate or the like.

That is, an object subjected to the structural analysis by the structural analysis apparatus (object to be analyzed) is a printed wiring substrate or the like.

Figure 1:
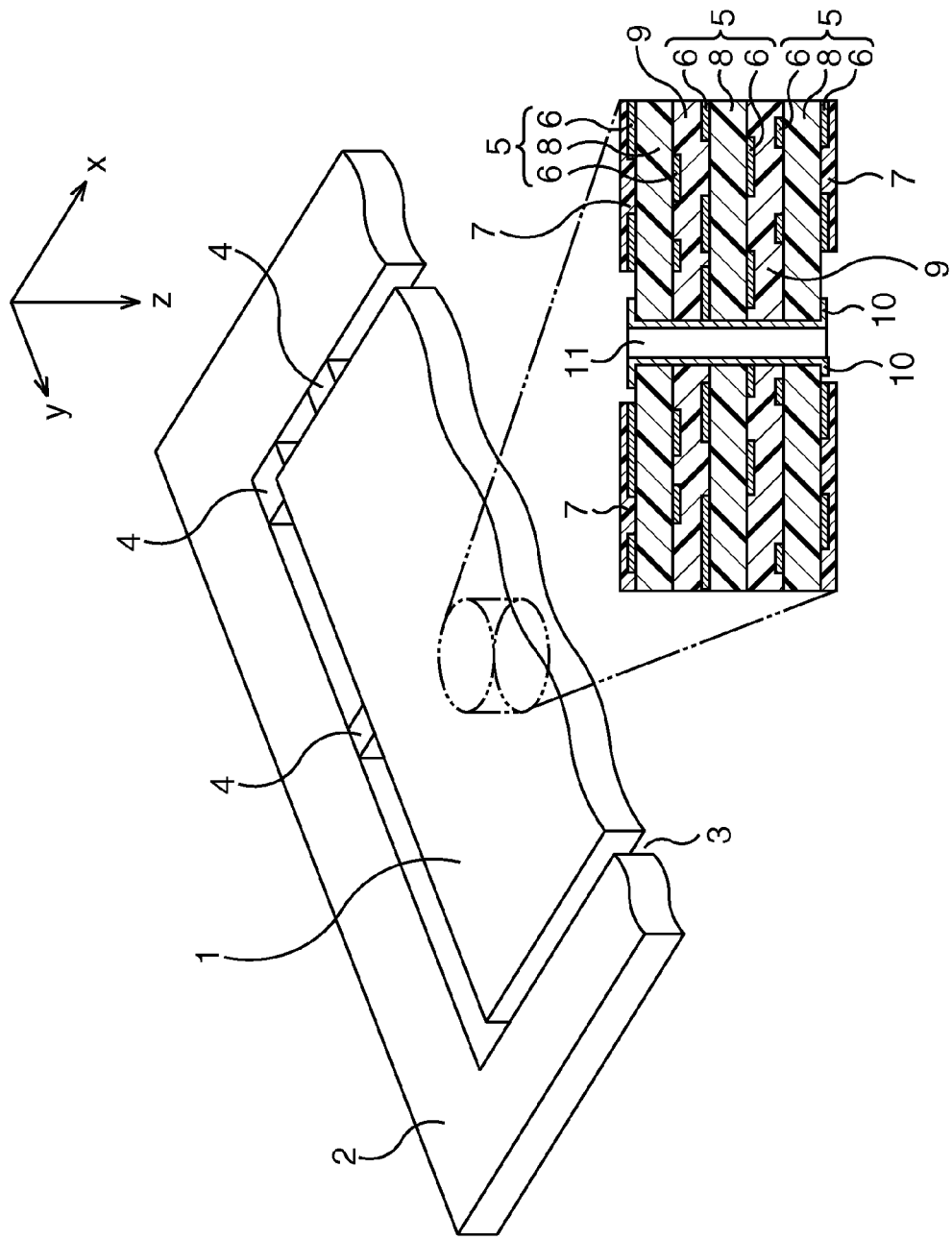
FIG. 1 is a diagram illustrating an example of an object to be analyzed by a structural analysis apparatus according to an embodiment.

First, an object to be analyzed will be described. FIG. 1 is a diagram illustrating an example of an object to be analyzed by the structural analysis apparatus according to the embodiment.

In the example, the object to be analyzed includes a printed wiring substrate 1 and a frame 2 surrounding the printed wiring substrate 1. A groove 3 is provided between the printed wiring substrate 1 and the frame 2, and ribs 4 connecting the printed wiring substrate 1 and the frame 2 are provided on the groove 3. The printed wiring substrate 1 and the frame 2 can be separated by cutting the ribs 4.

The printed wiring substrate 1, the frame 2, and the ribs 4 have a multilayered structure. More specifically, copper lamination plates 5 in which copper foils 6 are selectively formed on both sides of a core material 8, and prepregs 9 are arranged alternately. For the core material 8 and the prepreg 9, a composite material including glass fibers impregnated with a thermosetting resin is used. Thus, the material of the copper foil 6 is a conductor, and the material of the core material 8 and prepreg 9 is a dielectric.

Such a multilayered structure is obtained by stacking and heat-pressing the copper lamination plates 5 and the prepregs 9. A solder resist 7 for preventing the adhesion of solder is selectively formed on the surface of the outermost copper lamination plate 5.

A via 11 is formed in the printed wiring substrate 1. A plating film 10 is formed on the inside wall of the via 11. A plurality of wiring layers (layers of copper foil 6) are mutually connected through the plating film 10. There is a cavity inside the via 11, and air is present in the cavity.

FIG. 2 is a diagram illustrating a surface of the printed wiring substrate 1 where electronic parts are to be mounted. As illustrated in FIG. 2, the via 11, a BGA (Ball Grid Array) support portion 13, an SOP (Small Outline Package) support portion 14, a QFP (Quad Flat Package) support portion 15, and so forth are provided on the surface where the electronic parts are to be mounted. The via 11, the BGA support portion 13, the SOP support portion 14, and the QFP support portion 15 are connected by wiring 12. Other support portions and wiring for other electronic parts may be provided.

Next, the structural analysis apparatus will be described. FIG. 3 is a block diagram illustrating a composition of the structural analysis apparatus according to the embodiment.

The structural analysis apparatus 30 according to the present embodiment includes a control portion 31, a RAM (Random Access Memory) 32, a storage portion 33, a peripheral apparatus connection interface (peripheral apparatus I/F) 35, an input portion 36 inputting information, and a display portion 37 displaying information. The control portion 31, the RAM 32, the storage portion 33, the peripheral apparatus I/F 35, the input portion 36 and the display portion 37 are mutually connected via a bus 34.

The control portion 31 includes a CPU (Central Processing Unit), executes a program that is stored in the RAM 32, and controls each part contained in the structural analysis apparatus 30.

The RAM 32 serves as a memory temporarily storing computation results of and programs for processing by the structural analysis apparatus 30.

As the storage portion 33, a nonvolatile storage medium such as a hard disk, optical disk, magnetic disk, or flash memory is used, and the storage portion 33 stores various data and programs for the OS (Operating System) to be stored in the RAM 32. The storage portion 33 also stores a material physical characteristics table 332 that associates materials contained in the object to be analyzed (e.g., printed wiring substrate) with physical characteristics thereof. Moreover, the storage portion 33 also stores a thickness table 333 that associates points that are specified by two-dimensional coordinates (xy coordinates in FIG. 1 or FIG. 2) on the surface of the object to be analyzed with a thickness (z-axis direction in FIG. 1) of the object to be analyzed at respective points.

The peripheral apparatus I/F 35 is an interface connecting peripheral apparatus. As the peripheral apparatus I/F, a parallel port, a USB (Universal Serial Bus) port, a PCI card slot and so forth are quoted. As the peripheral apparatus, a printer, a TV tuner, a SCSI (Small Computer System Interface) apparatus, an audio apparatus, a driving apparatus, a memory card reader/writer, a network interface card, a wireless LAN card, a modem card, a keyboard, a mouse, and a display apparatus are quoted. Connection between the peripheral apparatus and structural analysis apparatus 30 may be wired or wireless.

As the input portion 36, an input apparatus such as a keyboard or a mouse is used for inputting an instruction request from a user.

As the display portion 37, a display such as a CRT (cathode ray tube) or a liquid-crystal display is used for presenting information to the user.

As the structural analysis apparatus 30, a desktop-type PC, a notebook-type PC, a PDA (Personal Digital Assistant), server or the like may be used.

The material physical characteristics table 332 and the thickness table 333 will now be described. FIG. 4 is a diagram illustrating an example of a data composition of the material physical characteristics table 332, and FIG. 5 is a diagram illustrating an example of a data composition of the thickness table 333.

As illustrated in FIG. 4, the material physical characteristics table 332 contains a "materials" column and a "physical-characteristic value list" column. Names of materials constituting the object to be analyzed are converted into values or symbols, and stored in the "materials" column. As the names of materials, a conductor, a composite material and air, for example, are quoted. Sequences of physical characteristic values of the materials stored in the "materials" column are converted into values or symbols and stored in the "physical-characteristic value list" column. As the physical characteristic values, a dielectric constant, a magnetic permeability, a conductivity, a magnetic resistance and a density, for example, are quoted. If a "material" is specified by referencing the material physical characteristics table 332, the physical characteristic values thereof may be obtained.

As illustrated in FIG. 5, the thickness table 333 contains a "positional information" column and a "thickness" column. As information that specifies the position of a point on the surface of the object to be analyzed, two-dimensional coordinates (xy coordinates in FIG. 1 and FIG. 2) are stored in the "positional information" column. The thickness (dimension in z-axis direction in FIG. 1) at the time of structural analysis of a position that is stored in the "positional information" column is converted into a proportion when the thickness of the object to be analyzed at the design stage is assumed to be 100%, and the proportion is stored in the "thickness" column. For example, when the thickness at the design stage is 5 mm and the "thickness" in the thickness table 333 is 80%, the thickness at the point is corrected to 4 mm when used in the structural analysis. The "thickness" is not limited to a proportion and may also be designated as length.

Figure 6:
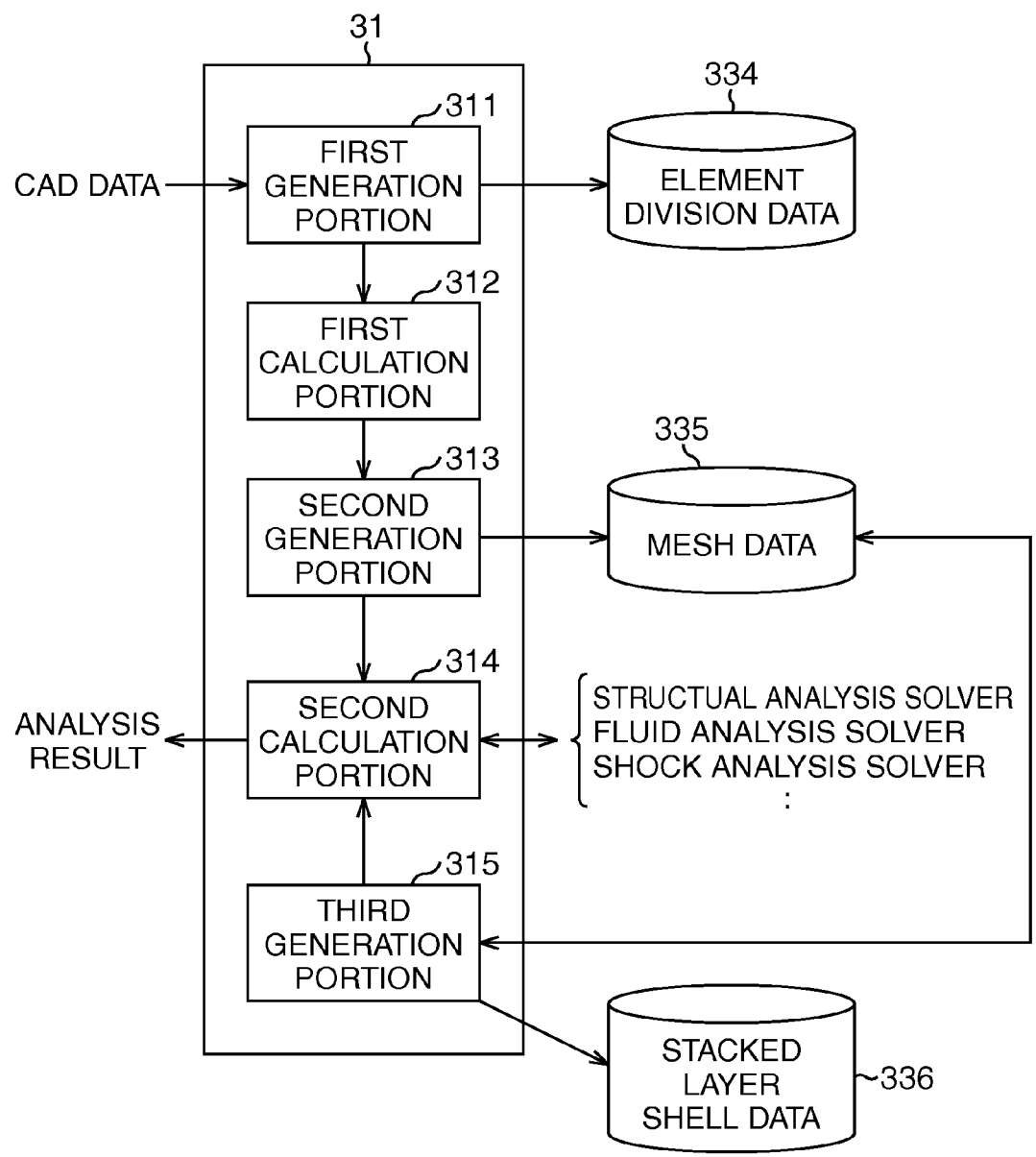
FIG. 6 is a functional block diagram illustrating a composition of a structural analysis apparatus 30.

Next, a function configuration of the structural analysis apparatus 30 will be described. FIG. 6 is a functional block diagram illustrating a composition of the structural analysis apparatus 30.

The control portion 31 of the structural analysis apparatus 30 includes a first generation portion 311, a first calculation portion 312, a second generation portion 313, a second calculation portion 314, and a third generation portion 315. Each of these portions is constituted by the CPU of the control portion 31 and a program that is executed by the CPU in the present embodiment, but may also be constituted by hardware.

The first generation portion 311 divides the object to be analyzed into a plurality of finite elements and generates element division data 334 that associates the positions of finite elements with materials. The element division data 334 is stored in the storage portion 33 as illustrated in FIG. 3.

The first calculation portion 312 defines and calculates a plurality of meshes for dividing the object to be analyzed into larger units than the finite elements.

The second generation portion 313 assumes that a friction layer which has a thickness of "0" and brings the friction coefficient between a conductive material (copper foil 6) and a composite material (core material 8 and prepreg 9) into a predetermined value less than 1 exists at the interface between the conductive material and the composite material, and the second generation portion 313 generates mesh data 335. The method of generating the mesh data 335 will be described in detail later. The mesh data 335 is stored in the storage portion 33 as illustrated in FIG. 3.

The second calculation portion 314 uses solvers such as a structural analysis solver, a fluid analysis solver, and a shock analysis solver to calculate the physical amounts produced in the object to be analyzed on the basis of the mesh data 335 and outputs the analysis result. In other words, the second calculation portion 314 performs a simulation of the behavior of the object to be analyzed. The simulation is performed within an arbitrary temperature range set by a user, for example. The second calculation portion 314 may also perform a structural analysis based on stacked layer shell data 336 generated by the third generation portion 315.

The third generation portion 315 specifies successive sections of the same material in the thickness direction of the mesh with the same two-dimensional coordinates from the mesh data, and the third generation portion 315 generates the stacked layer shell data 336 that associates the successive material and the thickness of the successive material with mesh positions. The stacked layer shell data 336 is stored in the storage portion 33 as illustrated in FIG. 3.

Next, an operation of the structural analysis apparatus 30 will be described. FIG. 7 is a flowchart illustrating the operation of the structural analysis apparatus 30 according to the embodiment.

Figures 8A, 8B:
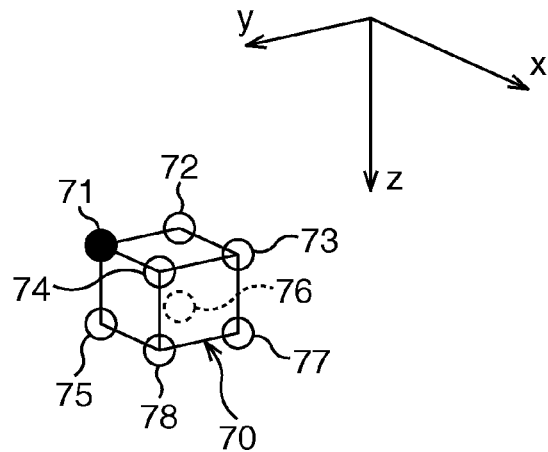
FIG. 8A is a diagram illustrating a cube as a finite element.
FIG. 8B is a diagram illustrating an example of a data composition of element division data 334.

First, CAD data specifying the formation of the object to be analyzed is supplied by a user or the like to the structural analysis apparatus 30. Then, based on the CAD data thus supplied, the first generation portion 311 divides the object to be analyzed into finite elements and generates element division data 334 (step S1). The element division data 334 thus generated is then stored in the storage portion 33. In this case, the first generation portion 311 may use a cube as a finite element. For example, by importing CAD-tool CAD data into Fujitsu's "Poynting", which is a commercial electromagnetic field analysis tool, the object to be analyzed (printed wiring substrate 1 and frame 2) can be divided into minute cubes. FIG. 8A is a diagram illustrating a cube as a finite element, and FIG. 8B is a diagram illustrating an example of a data composition of the element division data 334.

The first generation portion 311 divides the object to be analyzed into the minute cubes 70 as illustrated in FIG. 8A. In this case, the size of each cube 70 (finite element) may be a size that allows the material thereof to be specified. In other words, for one cube 70, the size is such that only one "material" illustrated in FIG. 4 is defined, avoiding the inclusion of two or more "materials" within one cube 70. Accordingly, there are cases where the thickness of the copper foil 6 matches the height of the cube 70, and there are also cases where the thickness of the copper foil 6 matches a multiple of the height of the cube 70.

The position of each finite element may be specified by specifying the coordinates of the corners of the cube 70, for example. Hereinafter, the corners of the cube are referred to as nodes and are distinguished into upper nodes (first node 71 to fourth node 74) and lower nodes (fifth node 75 to eighth node 78) depending on the position in the thickness direction (z-axis direction).

The element division data 334 in FIG. 8B includes information about the "element ID", "layer number", "first node" to "eighth node", and "material".

The "element ID" is an identifier to specify each finite element.

The "layer number" stores an identifier that specifies the number of the layer, which includes the finite element specified by the identifier indicated in the "element ID" field. The thickness of one layer may be the height of laying one cube 70 as a finite element. Therefore, the layer to which a finite element belongs is, more specifically, determined by the z coordinate of the upper node of each finite element (first node 71, for example) and the z coordinate of the lower node immediately below the first node 71 (fifth node 75, for example).

The "first node" to "eighth node" indicate the coordinates specifying the corners of the cube 70, which is a finite element specified by the identifier indicated in the "element ID" field. The position of the finite element may be specified not only by the corner coordinates of the cube 70 but also by a combination of the first node 71 (filled black circle in FIG. 8A) and the length of one side of the cube 70, for example.

The "material" indicates the name of a material ("material" in a material table in FIG. 4) constituting a finite element specified by the identifier indicated in the "element ID" field. In cases where the same material is laid successively, like the finite elements in FIG. 8B whose "element ID" is "2" and "3", the "material" may be the same even when the "element ID" are different from each other.

When the element division data 334 is generated (step S1), the first calculation portion 312 defines the mesh for dividing the object to be analyzed into larger units than the finite elements divided by the first generation portion 311 (step S2). At this time, the first calculation portion 312 divides the object to be analyzed that has been divided into finite elements into layers, and grasps the layout on a two-dimensional plane (xy coordinates in FIG. 1) of each layer. Next, within the two-dimensional plane, the first calculation portion 312 defines a mesh larger than a finite element so that only one type of "material" is contained in one mesh.

Figure 9:
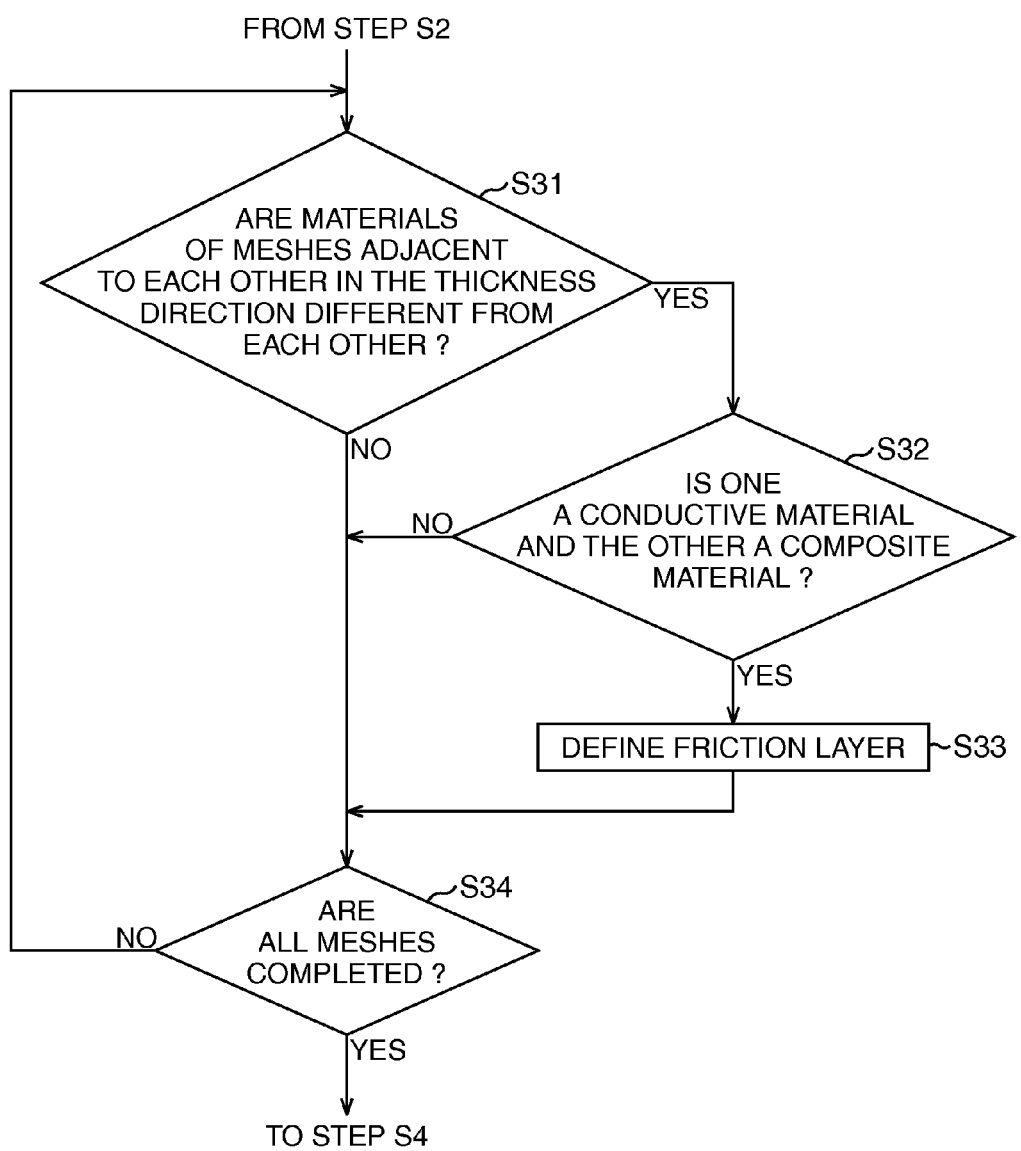
FIG. 9 is a flowchart illustrating a method of generating mesh data 335.

Next, the second generation portion 313 uses the mesh defined by the first calculation portion 312 to generate mesh data 335 (step S3). The detail of step S3 will now be described with reference to FIG. 9. FIG. 9 is a flowchart illustrating a method of generating the mesh data 335.

The second generation portion 313 first determines whether any two meshes that are adjacent to each other in the thickness direction are made of materials that are different from each other (step S31). In other words, the second generation portion 313 determines whether the "materials" of the pair of meshes are different from each other.

When the second generation portion 313 determines that the pair of meshes are made of materials that are different from each other, the second generation portion 313 determines whether one of them is made of a "conductive material" and the other is made of a "composite material having a glass transition temperature within the temperature range of the object to be analyzed" (step S32). Hereinafter, the "composite material having a glass transition temperature within the temperature range of the object to be analyzed" is simply referred to as a "composite material".

When the second generation portion 313 determines that one of them is made of a "conductive material" and the other is made of a "composite material", the second generation portion 313 determines that a friction layer which has a thickness of "0" and brings a friction coefficient between the "conductive material" and the "composite material" into a predetermined value less than 1 exists at the interface between the conductive material and the composite material (step S33). In this case, the friction coefficient may be a value obtained by subtracting from "1" a loss value (ratio of storage modulus to loss modulus) in a dynamic mechanical analysis (DMA) temperature scan of the "composite material". Here, the value "1" is a loss value in a case where there is no friction. Such a friction coefficient may be around 0.3 to 0.4, and the detailed value thereof may be measured according to the types of the "composite material" and "conductive material", and stored in the storage portion 33 in advance. As the loss value in the DMA temperature scan, the loss value in the shearing direction of the "composite material" may be used, for example. This is because, unlike the loss values in the tensile direction and compression direction, in which there is one force action axis, the loss values in the shearing direction are preferable as three-dimensional constants (constants for the amount of deformation and stress) of a structure in cases such as flexion and bending, where there are a plurality of force action axes. The processing of step S33 is performed mainly for the interface between the core material 8 or prepreg 9 and the copper foil 6.

On the other hand, when the second generation portion 313 determines that at least one of the pair of meshes is not made of a "conductive material" or "composite material" in step S32, the second generation portion 313 determines whether or nor the determination of all combinations of meshes is completed (step S34); if not, this process goes back to step S31, where determination of the remaining combinations is performed. Even when the second generation portion 313 determines that the pair of meshes are made of the same material in step S31, the processing of step S36 is performed.

In this manner, the mesh data 335 is generated. The second generation portion 313 performs processing of step S34 even after step S33.

When the mesh data 335 is generated, the second calculation portion 314 performs thickness correction by referencing the thickness table 333 (step S4). In other words, the second calculation portion 314 calculates, as the thickness of each layer, a numerical value obtained by multiplying the length of the sides of the cube 70 by the proportion specified by the "thickness".

Next, the second calculation portion 314 performs a structural analysis by using solver programs (rigidity equation solution) based on the mesh data 335 (step S5). At this time, when the thickness has been corrected in step S4, the second calculation portion 314 uses the mesh data 335 reflecting the corrected thickness. As the solver program, a structural analysis solver, a fluid analysis solver, and a shock analysis solver are quoted, and a thermal conduction analysis, a thermal stress analysis, a shock analysis, and the like are performed on the object to be analyzed. In particular, in the present embodiment, analysis as to what kind of warpage is produced in the printed wiring substrate 1 when electronic parts are mounted is performed.

In the present embodiment, as described above, analysis is performed assuming that a predetermined friction layer exists between the portion made of a composite material such as the core material 8 and prepreg 9 and the portion made of a conductive material such as the copper foil 6. On the other hand, in prior methods, the friction coefficient between the composite material and the conductive material is always 1. Because of the difference and the like, the present embodiment allows the complex behavior in the composite material around the glass transition temperature to be simplified and included in the analysis, thus the accuracy of the structural analysis is increased. In other words, calculation required for the structural analysis reflecting stress relaxation by an increase in fluidity at the glass transition temperature can be performed.

Figures 10, 11:
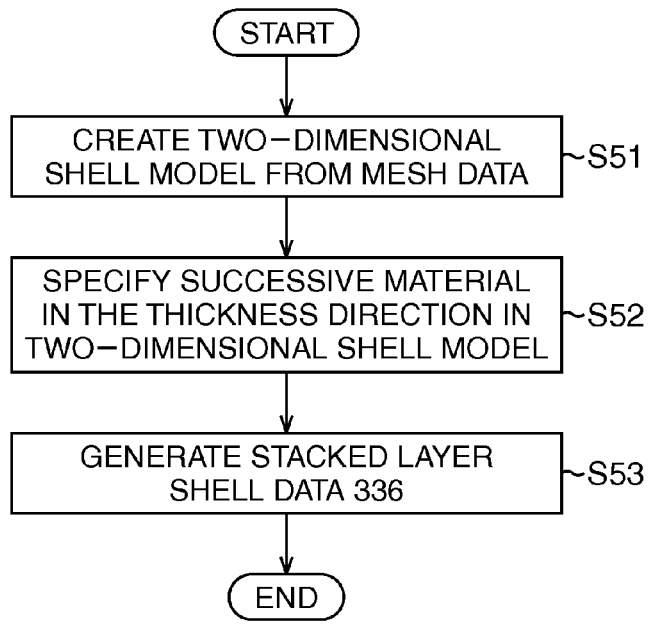
FIG. 10 is a flowchart illustrating a method of generating stacked layer shell data 336.
FIG. 11 is a diagram illustrating an example of a data composition of stacked layer shell data 336.

When structural analysis is performed, the stacked layer shell data 336 may be used instead of the mesh data 335. In this case, the third generation portion 315 may generate the stacked layer shell data 336 between step S3 and step S4. FIG. 10 is a flowchart illustrating a method of generating the stacked layer shell data 336.

The third generation portion 315 first creates a two-dimensional shell model from the mesh data 335 (step S51). The two-dimensional shell model is a model in which a plurality of meshes with the same two-dimensional coordinates of the first node 71 to fourth node 74 are consolidated in different layers, and ordered starting from the mesh with the smallest z-axis coordinate value. That is, the two-dimensional shell model is a model in which a plurality of overlapping meshes is consolidated when each layer is projected on an xy plane.

Then, the third generation portion 315 specifies successive materials in the thickness direction (z-axis direction) for each mesh consolidated in the two-dimensional shell model (step S52).

The third generation portion 315 then calculates the thickness of each material depending on how many successive layers there are for each material and generates the stacked layer shell data 336 (step S53). FIG. 11 is a diagram illustrating an example of a data composition of the stacked layer shell data 336.

The stacked layer shell data in FIG. 11 includes information about the "two-dimensional mesh ID", "first node", to "fourth node" and "material and thickness list".

The "two-dimensional mesh ID" indicates an identifier specifying a mesh that is obtained by consolidating a plurality of meshes with the same two-dimensional coordinates in a two-dimensional mesh model.

The "first node" to "fourth node" indicate the two-dimensional coordinates specifying the corners of the mesh specified by the identifier indicated in the "two-dimensional mesh ID" field.

The "material and thickness list" is a list that pairs a name of the successive materials in a thickness direction with a thickness. The thickness may be an actual length or a number of successive layers. In the latter case, if a side length of the cube 70 as a finite element is known, it can be converted into the actual length.

When the stacked layer shell data 336 is used for the structural analysis, in step S4, as the thickness of each material constituting the mesh, the second calculation portion 314 multiplies the thickness in the "materials and thickness list" corresponding to the material by the proportion of the "thickness" (see thickness table 333 in FIG. 5) at the center of the mesh. For example, regarding the mesh whose "two-dimensional mesh ID" in FIG. 11 is "1", when the "thickness" in the middle position of a mesh is set at 80%, the second calculation portion 314 takes a value obtained by multiplying thickness "T11" corresponding to the material "M1" by 0.8 as the thickness of the material "M1". Similarly, regarding other materials "M2" and "M3" contained in the mesh whose "two-dimensional mesh ID" is "1", the second calculation portion 314 takes a value obtained by multiplying thickness "T12" and "T13" by 0.8, as the thickness of the materials "M2" and "M3".

The object to be analyzed by the structural analysis apparatus 30 may also be only the printed wiring substrate 1. Alternatively, a part of the printed wiring substrate 1 and/or frame 2 may be the object to be analyzed.

Figure 12A:
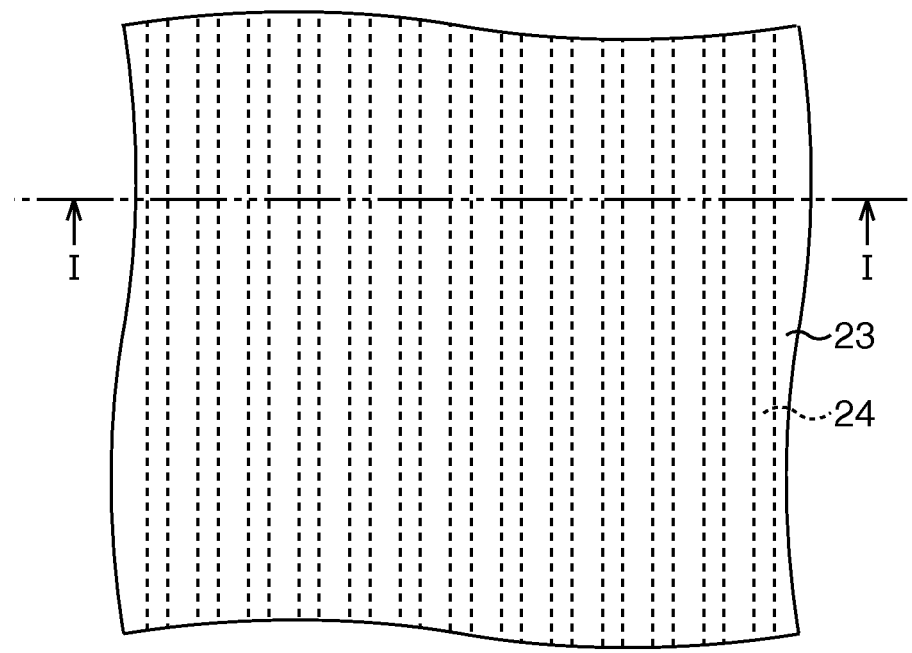
FIG. 12A is a plan view illustrating an object to be analyzed.

Next, the details and results of the structural analysis actually performed by the present inventors will be described. FIG. 12A is a plan view illustrating an object to be analyzed, and FIG. 12B is a cross-sectional view along the line I-I in FIG. 12A.

Figure 12B:
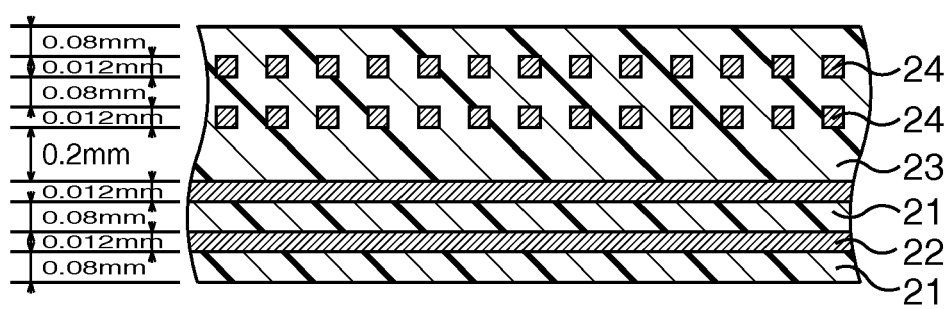
FIG. 12B is a cross-sectional view along the line I-I in FIG. 12A.

In the structural analysis, the object to be analyzed illustrated in FIGS. 12A and 12B was used. In the object to be analyzed, a copper foil 22 was formed on a composite material 21, and another composite material 21 and another copper foil 22 were formed on the copper foil 22. The thickness of the composite material 21 was 0.08 mm, and the thickness of the copper foil 22 was 0.012 mm. A composite material 23 having a thickness of 0.384 mm was formed on the upper copper foil 22. In the composite material 23, a plurality of copper foils 24 having a width of 1 mm, and a height of 0.012 mm was embedded in two layers with a spacing of 1 mm in the horizontal direction. The spacing between the lower copper foil 24 and the upper copper foil 22 was 0.2 mm, and the spacing for the two layers of copper foil 24 was 0.08 mm. Therefore, the distance between the upper copper foil 24 and the top surface of the composite material 23 was 0.08 mm. The shape of the plane surface of the object to be analyzed was a square, 100 mm each side.

Then, by using the structural analysis apparatus 30, the amount of warpage of the object to be analyzed at various mounting temperatures was analyzed. For this analysis, a commercial structural analysis software (ABAQUAS) was used to analyze stress at a predetermined temperature, and obtain the amount of warpage based on the stress. The result is illustrated in FIG. 13.

Figure 13:
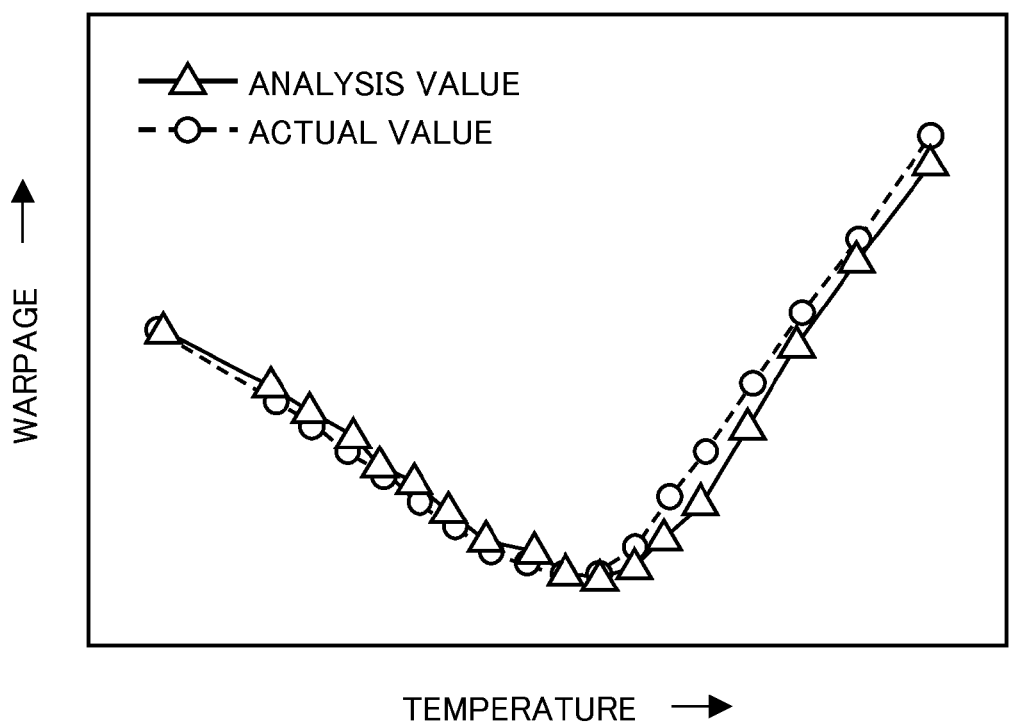
FIG. 13 is a graph illustrating a result of analysis actually performed (simulation).

As illustrated in FIG. 13, the analysis value almost matched the actual value. That is, it can be said that highly accurate structural analysis was performed. Although the analysis value is considerably smaller than the actual value near the minimal value with prior methods, such an offset can be prevented with the structural analysis apparatus 30 according to the present embodiment. This is because an assumption is made that a predetermined friction layer exists between the composite material 23 and the copper foil 24.

According to the embodiment, a simulation is performed assuming that the friction coefficient between a finite element containing a material having a glass transition temperature within a predetermined temperature range and a finite element made of a material having a glass transition temperature outside the predetermined temperature range is less than 1, complex behavior in the material having a glass transition temperature within the predetermined temperature range, such as a composite material, may be reflected. As a result, highly accurate analysis can be performed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has(have) been described in detail, it should be understood that the various changes, substitutions, and alterations could be made hereto without departing from the spirit and scope of the invention.

What is claimed is:

1. An apparatus for analyzing a structure of a printed wiring substrate comprising:
   a processor, wherein the processor is configured to operate in accordance with executable instructions that, when executed, cause the processor to operate as
   a divider dividing an object to be analyzed into a plurality of elements;
   a simulator performing a simulation of a behavior of the object to be analyzed within an arbitrary temperature range with using the plurality of elements; and
   an assumer assuming that, when among the plurality of elements, one of the adjacent elements contains a material having a glass transition temperature within the temperature range, and the other contains a material not having a glass transition temperature within the temperature range, a friction coefficient between the elements is less than one,
   wherein the simulator, if the assumption has been made by the assumer, uses an assumed friction coefficient.

2. The apparatus according to claim 1, wherein the assumer assumes that a virtual layer which has a thickness of 0, and a friction coefficient between the elements of less than one exists between the elements.

3. The apparatus according to claim 1, wherein the assumer uses, as the friction coefficient, a value obtained by subtracting from 1 a loss value in a Dynamic Mechanical Analysis (DMA) temperature scan of the material having a glass transition temperature within the temperature range.

4. The apparatus according to claim 3, wherein the assumer uses, as a loss value in the Dynamic Mechanical Analysis (DMA) temperature scan, a loss value in a shearing direction of the material having a glass transition temperature within the temperature range.

5. The apparatus according to claim 1, wherein the simulator performs a simulation of an amount of deformation of the object to be analyzed, as the simulation of the behavior.

6. The apparatus according to claim 1, wherein the material having a glass transition temperature within the temperature range is a thermosetting resin.

7. An analysis method comprising:
   dividing an object to be analyzed into a plurality of elements;
   performing a simulation of a behavior of the object to be analyzed within an arbitrary temperature range with using the plurality of elements; and
   assuming that, when among the plurality of elements, one of the adjacent elements contains a material having a glass transition temperature within the temperature range, and the other contains a material not having a glass transition temperature within the temperature range, a friction coefficient between the elements is less than one, wherein in the performing a simulation, if the assumption has been made in the assuming, an assumed friction coefficient is used.

8. The analysis method according to claim 7, wherein, in the assuming, an assumption is made that a virtual layer which has a thickness of 0, and a friction coefficient between the elements of less than one exists between the elements.

9. The analysis method according to claim 7, wherein, in the assuming, as the friction coefficient, a value is used which is obtained by subtracting from 1 a loss value in a Dynamic Mechanical Analysis (DMA) temperature scan of the material having a glass transition temperature within the temperature range.

10. The analysis method according to claim 9, wherein, in the assuming, as a loss value in the Dynamic Mechanical Analysis (DMA) temperature scan, a loss value in a shearing direction of the material having a glass transition temperature within the temperature range is used.

11. The analysis method according to claim 7, wherein, in the performing a simulation, a simulation of an amount of deformation of the object to be analyzed is performed as the simulation of the behavior.

12. The analysis method according to claim 7, wherein the material having a glass transition temperature within the temperature range is a thermosetting resin.

* * * * *